US012626329B2

(12) United States Patent
Jung et al.

(10) Patent No.: US 12,626,329 B2
(45) Date of Patent: May 12, 2026

(54) ELECTRONIC DEVICE FOR UPSCALING IMAGE AND METHOD FOR CONTROLLING SAME

(71) Applicant: SAMSUNG ELECTRONICS CO., LTD., Suwon-si (KR)

(72) Inventors: Bongsoo Jung, Suwon-si (KR); Bonghyuck Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 344 days.

(21) Appl. No.: 18/313,755

(22) Filed: May 8, 2023

(65) Prior Publication Data

US 2023/0334622 A1     Oct. 19, 2023

Related U.S. Application Data

(63) Continuation of application No. PCT/KR2021/020319, filed on Dec. 30, 2021.

(30) Foreign Application Priority Data

Jan. 13, 2021    (KR) ........................ 10-2021-0004768

(51) Int. Cl.
 *G06T 3/40*         (2024.01)
 *G06T 3/4046*       (2024.01)
 *G06T 5/50*         (2006.01)

(52) U.S. Cl.
 CPC ............. *G06T 3/4046* (2013.01); *G06T 5/50* (2013.01); *G06T 2207/20021* (2013.01); *G06T 2207/20221* (2013.01)

(58) Field of Classification Search
 CPC .................... G06T 3/4046; G06T 5/50; G06T 2207/20021; G06T 2207/20221;
(Continued)

(56) References Cited

U.S. PATENT DOCUMENTS 6,272,261 B1 * 8/2001 Matsuoka ............. G06T 3/4007
                                                                     382/300
10,652,565 B1    5/2020 Zhang et al.
(Continued)

FOREIGN PATENT DOCUMENTS

JP      2020508504 A     3/2020
KR     20180062422 A     6/2018
(Continued)

OTHER PUBLICATIONS

Liu et al., "Partial Convolution based Padding", pub. Nov. 28, 2018, (Year: 2018).*

(Continued)

*Primary Examiner* — Mekonen T Bekele
(74) *Attorney, Agent, or Firm* — Nixon & Vanderhye, P.C.

(57)         ABSTRACT

An example electronic device includes a memory; a display; and at least one processor operatively coupled to the memory and the display. The at least one processor may be configured to divide an input image into a plurality of divided images, acquire image characteristics included in each of the plurality of divided images, identify at least one deep learning model to process each of the plurality of divided images from among a plurality of deep learning models for upscaling stored in a memory on the basis of the image characteristics, acquire a plurality of upscaled segmented images corresponding respectively to the plurality of divided images through the at least one deep learning model, merge the plurality of upscaled divided images to obtain an upscaled image, and display the upscaled image on the display.

18 Claims, 10 Drawing Sheets

(58) Field of Classification Search
CPC . G06T 3/4053; G06T 3/40; G06T 7/11; G06T 2207/20081; G06T 2207/20084; G06T 2207/30201; G06N 3/04; G06N 3/08; G06N 3/045; G06V 40/16
See application file for complete search history.

(56)                 References Cited

U.S. PATENT DOCUMENTS

| | | | |
|---|---|---|---|
| 2018/0150681 A1 | 5/2018 | Wang et al. | |
| 2018/0150740 A1* | 5/2018 | Wang | G06T 5/50 |
| 2018/0293707 A1 | 10/2018 | El-khamy et al. | |
| 2019/0114748 A1 | 4/2019 | Lin et al. | |
| 2019/0139205 A1 | 5/2019 | El-khamy et al. | |
| 2019/0188535 A1 | 6/2019 | Chen et al. | |
| 2019/0378247 A1 | 12/2019 | Huang et al. | |
| 2020/0043135 A1 | 2/2020 | Chou et al. | |
| 2020/0051211 A1 | 2/2020 | Shiokawa et al. | |
| 2020/0053362 A1 | 2/2020 | Fu et al. | |
| 2020/0126184 A1 | 4/2020 | Zhu et al. | |
| 2020/0160096 A1 | 5/2020 | Lee et al. | |
| 2020/0177470 A1 | 6/2020 | Kuo et al. | |
| 2020/0202174 A1 | 6/2020 | Lin | |
| 2020/0226718 A1 | 7/2020 | Reddy | |
| 2021/0027425 A1 | 1/2021 | Kalchbrenner et al. | |
| 2021/0073945 A1* | 3/2021 | Kim | G06N 3/045 |
| 2021/0295473 A1 | 9/2021 | Yu et al. | |

FOREIGN PATENT DOCUMENTS

| | | |
|---|---|---|
| KR | 20190110965 A | 10/2019 |
| KR | 20200063303 A | 6/2020 |
| KR | 102161359 B1 | 9/2020 |
| WO | 2016164189 A1 | 10/2016 |

OTHER PUBLICATIONS

International Search Report for PCT/KR2021/020319 mailed Apr. 7, 2022, 5 pages.
Written Opinion of the ISA for PCT/KR2021/020319 mailed Apr. 7, 2022, 4 pages.
Office Action dated Oct. 31, 2024 in Korean Patent Application No. 10-2021-0004768 and English-language translation.

* cited by examiner

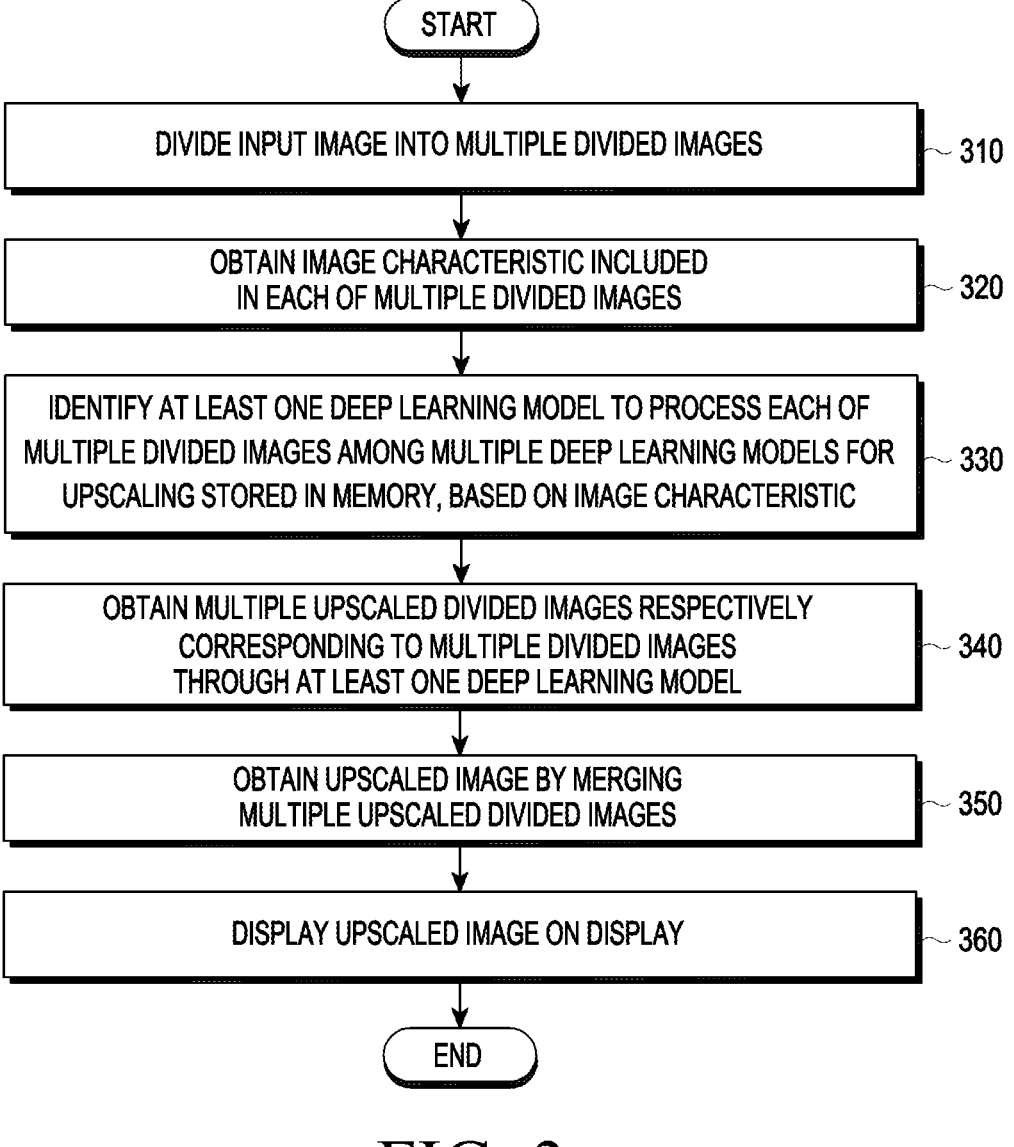

START

DIVIDE INPUT IMAGE INTO MULTIPLE DIVIDED IMAGES ~ 310

OBTAIN IMAGE CHARACTERISTIC INCLUDED
IN EACH OF MULTIPLE DIVIDED IMAGES ~ 320

IDENTIFY AT LEAST ONE DEEP LEARNING MODEL TO PROCESS EACH OF
MULTIPLE DIVIDED IMAGES AMONG MULTIPLE DEEP LEARNING MODELS FOR
UPSCALING STORED IN MEMORY, BASED ON IMAGE CHARACTERISTIC ~ 330

OBTAIN MULTIPLE UPSCALED DIVIDED IMAGES RESPECTIVELY
CORRESPONDING TO MULTIPLE DIVIDED IMAGES
THROUGH AT LEAST ONE DEEP LEARNING MODEL ~ 340

OBTAIN UPSCALED IMAGE BY MERGING
MULTIPLE UPSCALED DIVIDED IMAGES ~ 350

DISPLAY UPSCALED IMAGE ON DISPLAY ~ 360

END

ELECTRONIC DEVICE FOR UPSCALING IMAGE AND METHOD FOR CONTROLLING SAME

CROSS REFERENCE TO RELATED APPLICATIONS

This application is a continuation of PCT/KR2021/020319, designating the United States, filed Dec. 30, 2021, in the Korean Intellectual Property Receiving Office, which claims priority to Korean Patent Application No. 10-2021-0004768, filed on Jan. 13, 2021, in the Korean Intellectual Property Office. The disclosures of each of these applications are incorporated herein in their entireties.

BACKGROUND

Field

The disclosure relates to an electronic device upscaling an image and a method for controlling the same.

Description of Related Art

Conventional image upscaling includes rule-based interpolation algorithms, such as nearest neighbor, bilinear, bicubic, and lanczos. These techniques operate in a manner to interpolate intermediate pixel values necessary for upscaling by referring to information about neighboring pixels based on their respective predetermined rules.

With the development of technology, image upscaling has recently been performed using a deep learning model for image upscaling. The deep learning model for image upscaling operates in a manner to select the optimal deep learning model parameters by learning a large number of input images and applying selected parameters to the input image.

These deep learning models may be divided into on-device modeling with a deep learning model engine in a mobile device and server-based modeling techniques with a deep learning model engine in a server.

SUMMARY

Conventional image upscaling schemes by rule-based interpolation algorithms, such as nearest neighbor, bilinear, bicubic, and lanczos, simply resize images but do not enhance the quality, causing image quality degradation of upscaled images.

A scheme of obtaining a high-resolution upscaled image using a deep learning model used to address such issues requires significant computational load and memory and thus use of such a deep learning model in a mobile device may be limited.

For example, when the deep learning model is used in a mobile device, if the resolution of the input image is large, the deep learning model requires a large amount of memory and may thus significantly slow down or, in a worst scenario case, shut down, operation of the mobile device, thereby restricting the size of the input image.

Accordingly, upscaling using a deep learning model is processed mostly on a server, and the processing results are received by a terminal.

Example embodiments of the disclosure provide an electronic device and a method for controlling the same, which may efficiently perform image upscaling using a deep learning model on a mobile device based on the characteristics of the input image and resources of the mobile device.

According to various example embodiments, an electronic device may include a memory, a display, and at least one processor operatively connected with the memory and the display. The at least one processor may be configured to divide an input image into a plurality of divided images, obtain an image characteristic included in each of the plurality of divided images, identify at least one deep learning model to process each of the plurality of divided images from among a plurality of deep learning models for upscaling stored in the memory, based on the image characteristic, obtain a plurality of upscaled divided images respectively corresponding to the plurality of divided images through the at least one deep learning model, obtain an upscaled image by merging the plurality of upscaled divided images, and display the upscaled image on the display.

According to various example embodiments, a method for controlling an electronic device may include dividing an input image into a plurality of divided images, obtaining an image characteristic included in each of the plurality of divided images, identifying at least one deep learning model to process each of the plurality of divided images from among a plurality of deep learning models for upscaling stored in a memory, based on the image characteristic, obtaining a plurality of upscaled divided images respectively corresponding to the plurality of divided images through the at least one deep learning model, obtaining an upscaled image by merging the plurality of upscaled divided images, and displaying the upscaled image.

According to various example embodiments, an electronic device may include a memory, a display, and at least one processor operatively connected with the memory and the display. The at least one processor may be configured to obtain an image characteristic for each area of an input image, divide the input image into a plurality of divided images based on the image characteristic for each area, identify at least one deep learning model to process of each of the plurality of divided images from among a plurality of deep learning models for upscaling stored in the memory based on the image characteristic for each area, obtain a plurality of upscaled divided images respectively corresponding to the plurality of divided images through the at least one deep learning model, obtain an upscaled image by merging the plurality of upscaled divided images, and display the upscaled image on the display.

According to various example embodiments of the disclosure, an electronic device may efficiently process upscaling of high-resolution images at high speed using an on-device deep learning model without (or with reduced) limitations to the input image size even on a mobile device having limited resources.

BRIEF DESCRIPTION OF THE DRAWINGS

The above and/or other aspects of the disclosure will be more apparent by describing certain embodiments of the disclosure with reference to the accompanying drawings, in which:

FIG. 3 is a flowchart illustrating an example image upscaling operation based on image characteristics of a divided image by an electronic device according to various embodiments;

DETAILED DESCRIPTION

According to the disclosure, in a method for upscaling an image by an electronic device, a method for recognizing image characteristics included in an image may obtain an image and output data produced by recognizing image characteristics in the image, using input data as input data of a deep learning model. The deep learning model may be obtained by training. Here, "obtained by training" may refer, for example, to a predefined operation rule or deep learning model configured to achieve a desired feature (or goal) being obtained by training a default deep learning model with multiple pieces of training data and a training algorithm. The deep learning model may, for example, include a plurality of neural network layers. Each of the plurality of neural network layers includes a plurality of weight values and performs neural network computation by computation between the result of computation by a previous layer and the plurality of weight values.

Visual understanding may refer, for example, to a technique for recognizing and processing things as does human vision and includes, e.g., object recognition, object tracking, image retrieval, human recognition, scene recognition, 3D reconstruction/localization, or image enhancement.

Figure 1:
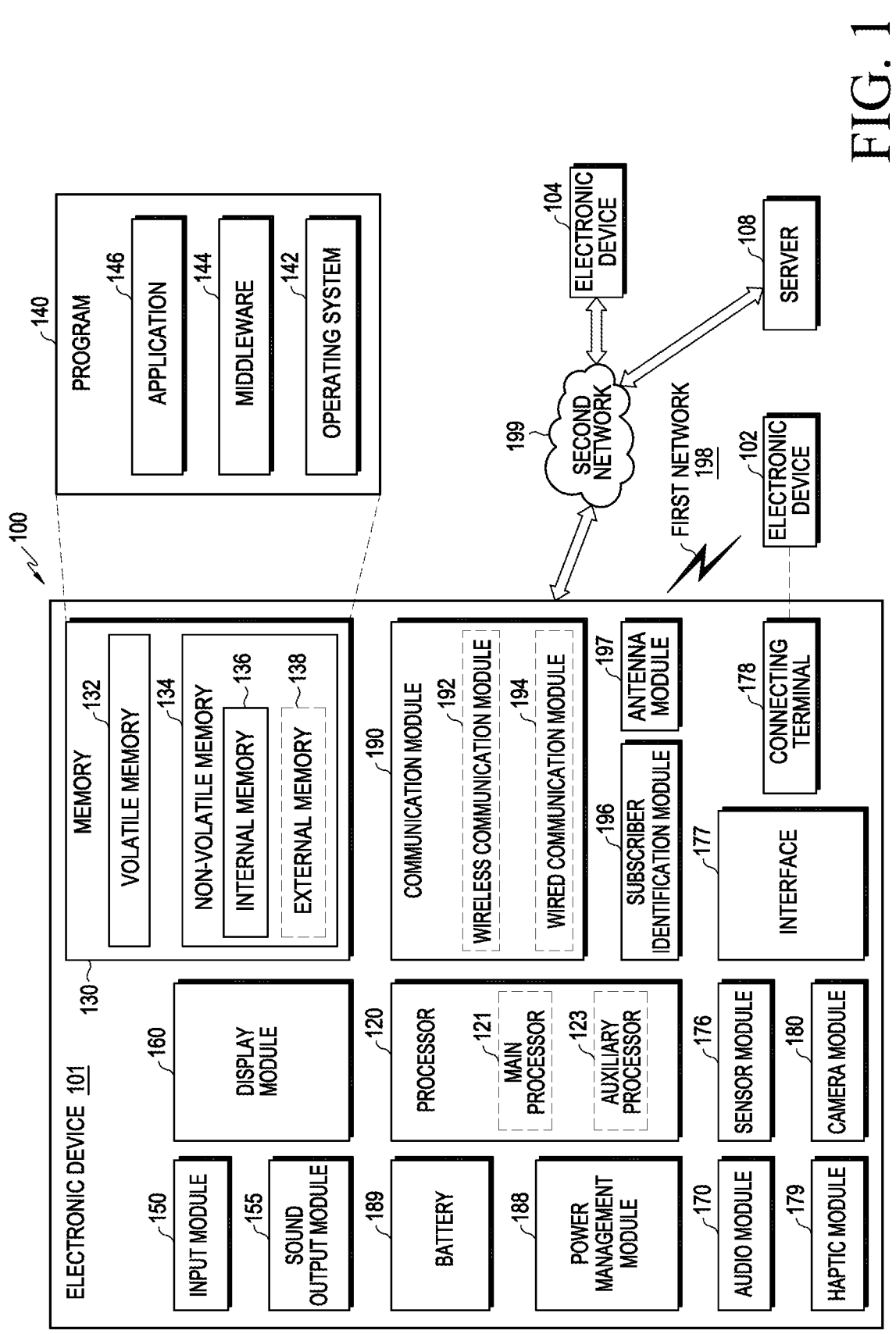
FIG. 1 is a view illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of, the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for deep learning model processing. The deep learning model may be generated via machine learning. Such learning may be performed, e.g., by the electronic device 101 where the deep learning model is performed or via a separate server (e.g., the server 108). Learning algorithms may include, but are not limited to, e.g., supervised learning, unsupervised learning, semi-supervised learning, or reinforcement learning. The deep learning model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof, but is not limited thereto. The deep learning model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other components (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of Ims or less) for implementing URLLC.

The antenna module 197 may transmit or receive a signal or power to or from the outside (e.g., the external electronic device). According to an embodiment, the antenna module 197 may include one antenna including a radiator formed of or including a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2:
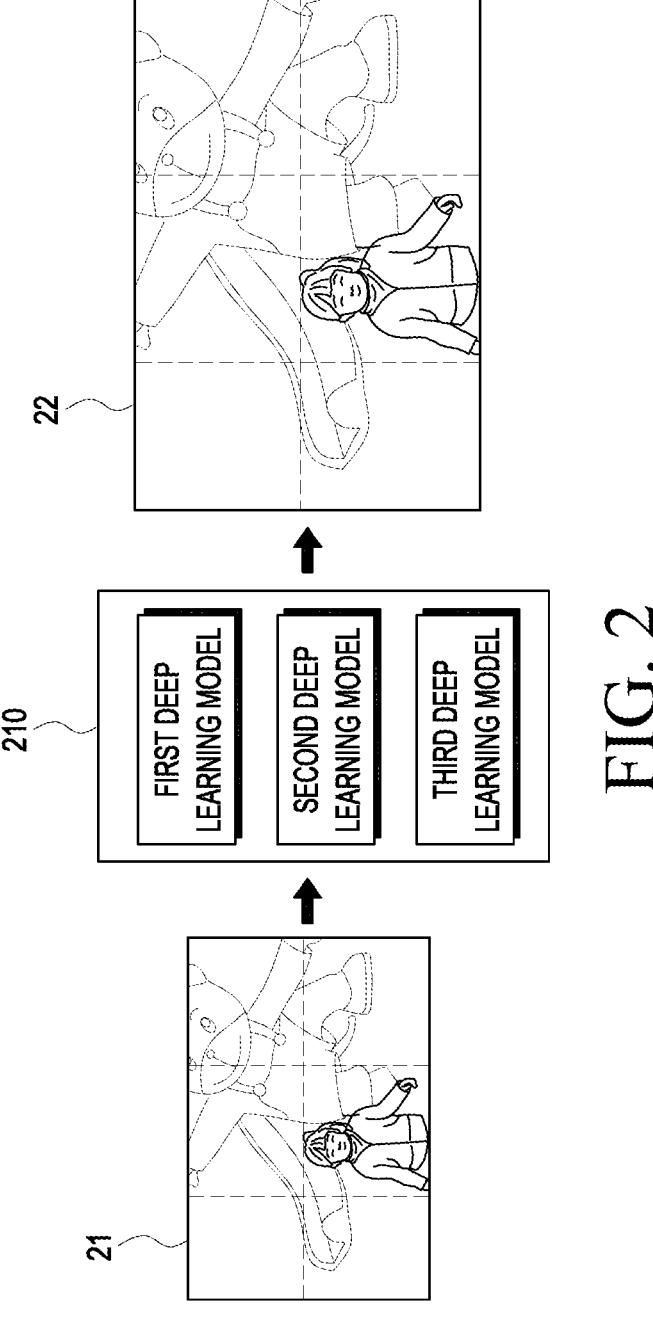
FIG. 2 is a view illustrating an example image upscaling operation by an electronic device according to various embodiments.

FIG. 2 is a view illustrating an example image upscaling operation by an electronic device according to various embodiments.

According to various embodiments, referring to FIG. 2, an electronic device (e.g., the electronic device 101 or processor 120 of FIG. 1) may input an input image 21 to a plurality of deep learning models 210 and obtain an upscaled image 22 from the plurality of deep learning models 210.

According to various embodiments, the electronic device may divide the input image 21 into a plurality of divided images and input each of the plurality of divided images to the plurality of deep learning models 210. For example, the electronic device may divide the image into a plurality of divided images based on the available size of the memory (e.g., the memory 130 of FIG. 1), the size of the input image 21, the computational capability of at least one processor (e.g., the processor 120 of FIG. 1), the size of each of the plurality of deep learning models 210, or the image characteristics of the input image 21. Each of the plurality of divided images may be input to the plurality of deep learning models 210 based on the image characteristics of each of the plurality of divided images.

According to various embodiments, image characteristics are characteristics that a user may recognize when viewing an image, and may include at least one of image attributes, such as brightness, color, saturation, and contrast of the image, as well as the frequency form of the image signal of each area in the image, the contour included in the image, the position of the edge, thickness, sharpness, density, complexity, color array, texture, and whether a specific object (e.g., face image, plant, car, or food) is included.

According to various embodiments, the electronic device may obtain the upscaled image 22 by merging the plurality of upscaled divided images output from the plurality of deep learning models 210.

According to various embodiments, the electronic device may display the upscaled image 22 on a display (e.g., the display module 160 of FIG. 1) or transmit it to an external electronic device (e.g., the electronic device 104 of FIG. 1) through a communication module (e.g., the communication module 190 of FIG. 1).

Hereinafter, an operation for obtaining an upscaled image by the plurality of deep learning models 210 is described in more detail with reference to FIGS. 3 to 10.

FIG. 3 is a flowchart illustrating an example image upscaling operation based on image characteristics of a divided image by an electronic device according to various embodiments.

According to various embodiments, referring to FIG. 3, in operation 310, the electronic device (e.g., the electronic device 101 or processor 120 of FIG. 1) may divide an input image (e.g., the input image 21 of FIG. 2) into a plurality of divided images.

For example, the electronic device may identify at least one of the number or size of the plurality of divided images based on at least one of the available size of the memory (e.g., the memory 130 of FIG. 1) or the size of the input image.

For example, if the available size of the memory is large, or the size of the input image is small, the electronic device may determine that the number of the plurality of divided images is small, and the size of each divided image is large.

According to various embodiments, the electronic device may identify at least one of the number or size of the plurality of divided images by further considering the computational capability of at least one processor (e.g., the processor 120 of FIG. 1) and the size of each of the plurality of deep learning models (e.g., the plurality of deep learning models 210 of FIG. 2). According to various embodiments, the electronic device may identify at least one of the number or size of the plurality of divided images based on the image characteristics included in the input image. An operation of dividing the input image based on the image characteristics is described below with reference to FIG. 7.

According to various embodiments, the memory may store a lookup table for sizes or numbers of divided images according to the available size of the memory, and the electronic device may identify at least one of the number or size of the divided images using the lookup table stored in the memory.

For example, when the size of the input image is 960×540, and a 3840×2160-size image is to be obtained through upscaling four times horizontally and vertically each, the electronic device may determine that the number of divided images is 6, or the size of the divided image is 320×270, based on at least one of the available size of the memory, the size of the input image, the computational capability of at least one processor, and the size of each of the plurality of deep learning models.

According to various embodiments, if the available size of the memory is less than a set value, or the size of the input image is larger than a set value, the electronic device may transmit the input image to a server (e.g., the server 108 of FIG. 1) so that an image upscaling operation is performed by the server.

According to various embodiments, the electronic device may perform padding so that each divided image overlaps its adjacent divided image in a set size of area, for a border processing operation in an operation for merging the plurality of upscaled divided images in subsequent operation 350. For example, upon performing a padding operation using four pixels for each divided image border, the electronic device may determine that the size of the divided image is 328×278. According to various embodiments, the size of the area where padding is to be performed may be adjusted according to the image complexity of the divided image. For example, the electronic device may identify that the area where padding is to be performed is wide if the complexity of the divided image is high and, if the complexity of the divided image is low, the area where padding is to be performed is narrow. According to various embodiments, the dividing operation considering the padding operation is described below with reference to FIG. 9.

According to various embodiments, in operation 320, the electronic device may obtain image characteristics included in each of the plurality of divided images.

For example, the electronic device may obtain at least one of the image complexity of each of the plurality of divided images or whether a specific object (e.g., face image, plant, car, or food) is included, as an image characteristic.

According to various embodiments, the image characteristics may include at least one of image attributes, such as brightness, color, saturation, and contrast of the image, as well as the frequency form of the image signal of each area in the image, the contour included in the image, the position of the edge, thickness, sharpness, density, complexity, color array, texture, and whether a specific object (e.g., face image, plant, car, or food) is included.

For example, the electronic device may obtain the value of the image complexity by analyzing at least one of the contour included in each of the divided images, the position of the edge, thickness, sharpness, density, or color array based on the frequency form of each divided image. In an embodiment, the electronic device may identify whether a specific object (e.g., face image, plant, car, or food) is included, based on at least one of the contour included in each of the divided images, color difference, or contrast.

According to various embodiments, in operation 330, the electronic device may identify at least one deep learning model to process each of the plurality of divided images among the plurality of deep learning models (e.g., the plurality of deep learning models 210 of FIG. 2) for upscaling stored in the memory, based on the image characteristics.

According to various embodiments, each deep learning model may include a plurality of network layers and may include at least one of a high-complexity deep learning model having a high network layer depth, a low-complexity deep learning model having a low network layer, or a deep learning model specified for a specific object.

For example, the electronic device may input divided images, which do not include a specific object (e.g., face image, plant, car, or food) and have an image complexity equal to or larger than a set value, to a first deep learning model having a high network layer depth among the plurality of divided images; divided images, which do not include the specific object and have an image complexity less than the set value among the plurality of divided images, to a second deep learning model having a low network layer depth; and divided images, which include the specific object (e.g., face image, plant, car, or food) among the plurality of divided images, to a third deep learning model specified for the specific object (e.g., face image, plant, car, or food). This is merely an example, and the divided images may be input to one deep learning model among three or more deep learning models depending on the image complexity. In an embodiment, the divided images may be input to one of two deep learning models depending on whether the divided images include a specific object (e.g., face image, plant, car, or food).

According to various embodiments, in operation 340, the electronic device may obtain a plurality of upscaled divided images respectively corresponding to the plurality of divided images through at least one deep learning model.

According to various embodiments, the electronic device may include at least one processor (e.g., the processor 120 of FIG. 1), and the at least one processor may perform an image upscaling operation using at least one of the plurality of deep learning models. For example, the at least one processor (or computation unit or operation unit) may include at least one of a central processing unit (CPU), a graphic processing unit (GPU), a display processing unit (DSP), or a neural processing unit (NPU).

According to various embodiments, the at least one processor may drive at least one of the plurality of deep learning models based on the computational capability of each of the at least one processor.

For example, a first deep learning model which is a high-complexity deep learning model may be driven by the GPU, a second deep learning model which is a low-complexity deep learning model may be driven by the CPU, and a third deep learning model specified for a specific object (e.g., face image, plant, car, or food) may be driven by the NPU. According to various embodiments, the plurality of deep learning models may be driven by one processor.

According to various embodiments, in operation 350, the electronic device may obtain an upscaled image by merging the plurality of upscaled divided images.

According to various embodiments, the electronic device may process the border areas of the plurality of upscaled divided images and merge the plurality of upscaled divided images.

For example, if the image is divided to have an area overlapping a neighboring divided image in operation 310, the electronic device may perform a border processing operation by determining that the average of the pixel value of the padding area corresponding to the overlapping area of the divided image before upscaling in the upscaled divided image and the pixel value of the padding area corresponding to the overlapping area of the adjacent divided image before upscaling in the adjacent upscaled divided image is the pixel value of the padding area corresponding to the overlapping area of the divided image before upscaling in the upscaled divided image. According to various embodiments, when the upscaled divided image and the adjacent upscaled divided image are output from different deep learning models, the electronic device may determine that the average obtained after applying a different weight to the pixel value of each padding area is the pixel value of the padding area of each of the upscaled divided image and the adjacent upscaled divided image.

According to an embodiment, the electronic device may perform a border processing operation by determining that the average pixel value of the padding area corresponding to the overlapping area of the additional device information before upscaling in the adjacent upscaled divided image is the pixel value of the padding area corresponding to the overlapping area of the divided image before upscaling in the upscaled divided image. For example, the electronic device may determine that the pixel value of the padding area of the upscaled divided image is the pixel value of the padding area of the adjacent upscaled divided image and that the pixel value of the padding area of the adjacent upscaled divided image is the pixel value of the padding area of the upscaled divided image.

According to various embodiments, in operation 360, the electronic device may display the upscaled image on the display (e.g., the display module 160 of FIG. 1).

For example, the electronic device may encode and display the upscaled image on the display.

According to various embodiments, the electronic device may add divided information about the input image or information about the used deep learning model, as metadata, to the upscaled image in the operation of encoding the upscaled image. The operation of adding the metadata to the upscaled image is described below with reference to FIG. 10.

According to various embodiments, the electronic device may transmit the upscaled image to an external electronic device (e.g., the electronic device 104 of FIG. 1) through the communication module (e.g., the communication module 190 of FIG. 1).

Figure 4:
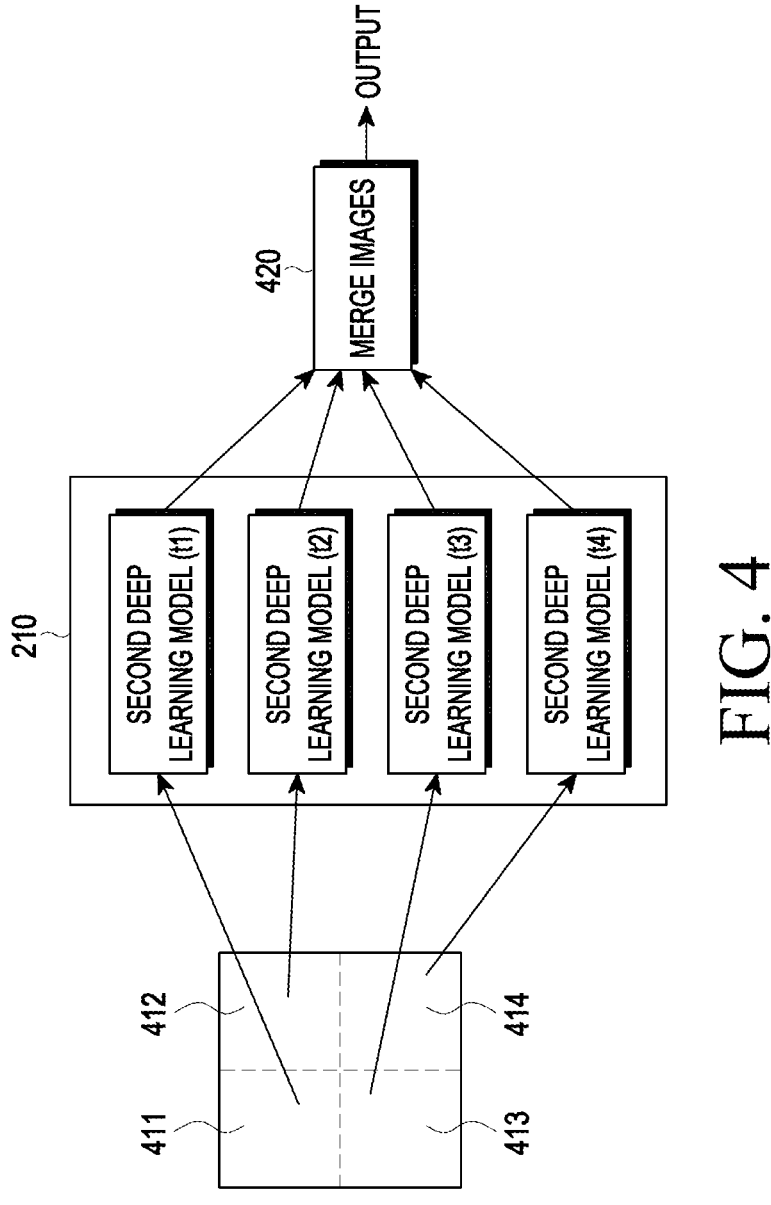
FIG. 4 is a view illustrating an example upscaling operation using a deep learning model according to image characteristics by an electronic device according to various embodiments.

FIG. 4 is a view illustrating an example upscaling operation using a deep learning model according to image characteristics by an electronic device according to various embodiments.

According to various embodiments, referring to FIG. 4, the electronic device (e.g., the electronic device 101 or processor 120 of FIG. 1) may divide an input image into four divided images 411, 412, 413, and 414. According to various embodiments, the electronic device may obtain the image characteristics of each of the four divided images 411, 412, 413, and 414 before or after dividing.

For example, upon identifying that the four divided images 411, 412, 413, and 414 all have a complexity less than a set value, the electronic device may input the four divided images 411, 412, 413, and 414 to the second deep learning model among the plurality of deep learning models 210.

According to various embodiments, the electronic device may perform upscaling on the four divided images 411, 412, 413, and 414 sequentially (t1, t2, t3, and t4) using the second deep learning model.

According to various embodiments, the electronic device may obtain an upscaled image by merging (420) the upscaled divided images respectively corresponding to the four divided images 411, 412, 413, and 414 output from the second deep learning model and output the obtained upscaled image.

According to various embodiments, when the four divided images 411, 412, 413, and 414 all have a complexity equal to or larger than the set value, the electronic device may sequentially perform the upscaling operation through the first deep learning model and, when the divided images 411, 412, 413, and 414 all include a specific object (e.g., face image, plant, car, or food), sequentially perform the upscaling operation through the third deep learning model.

According to various embodiments, when the memory (e.g., the memory 130 of FIG. 1) does not store a third deep learning model specified for the specific object, the electronic device may select a deep learning model based on the image complexity of each divided image.

Figure 5:
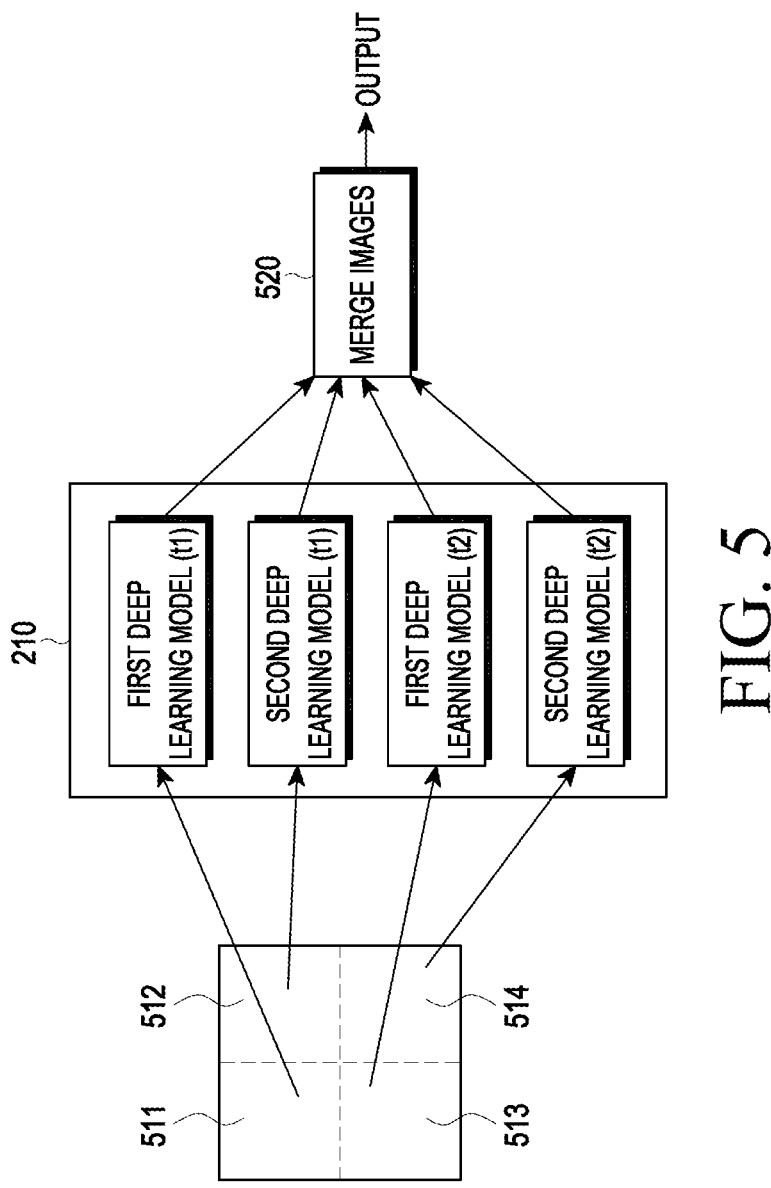
FIG. 5 is a view illustrating an example upscaling operation using a deep learning model according to image characteristics by an electronic device according to various embodiments.

FIG. 5 is a view illustrating an example upscaling operation using a deep learning model according to image characteristics by an electronic device according to various embodiments.

According to various embodiments, referring to FIG. 5, the electronic device (e.g., the electronic device 101 or processor 120 of FIG. 1) may divide an input image into four divided images 511, 512, 513, and 514. According to various embodiments, the electronic device may obtain the image characteristics of each of the four divided images 511, 512, 513, and 514 before or after dividing.

For example, upon identifying that among the four divided images 511, 512, 513, and 514, a first divided image 511 and a third divided image 513 have an image complexity equal to or larger than a set value, and a second divided image 512 and a fourth divided image 514 have an image complexity less than the set value, the electronic device may input the first divided image 511 and the third divided image 513 to the first deep learning model among the plurality of deep learning models 210 and the second divided image 512 and the fourth divided image 514 to the second deep learning model.

According to various embodiments, the electronic device may perform upscaling in parallel (t1) on the first divided image 511 and the second divided image 512 through the first deep learning model and the second deep learning model, respectively.

According to various embodiments, after upscaling (t1) the first divided image 511 and the second divided image 512, the electronic device may perform upscaling in parallel (t2) on the third divided image 513 and the fourth divided image 514 through the first deep learning model and the second deep learning model, respectively.

According to various embodiments, the electronic device may obtain an upscaled image by merging (520) the upscaled divided images respectively corresponding to the four divided images 511, 512, 513, and 514 output from the first deep learning model and second deep learning model and output the obtained upscaled image.

According to various embodiments, if among the four divided images 511, 512, 513, and 514, only three divided images have an image complexity equal to or larger than a set value, and one divided image has an image complexity less than the set value, the electronic device may sequentially upscale three divided images using the first deep learning model and upscale one divided image using the second deep learning model, in parallel with the upscaling operation on one of the other three divided images.

Figure 6:
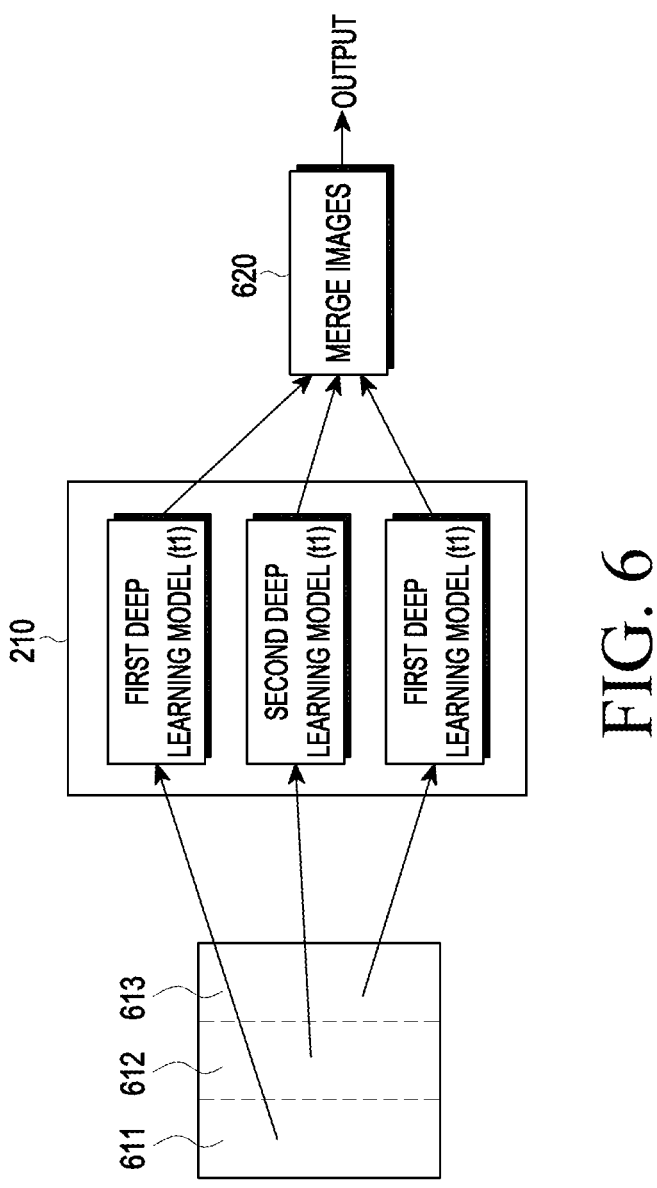
FIG. 6 is a view illustrating an example upscaling operation using a deep learning model according to image characteristics by an electronic device according to various embodiments.

FIG. 6 is a view illustrating an example upscaling operation using a deep learning model according to image characteristics by an electronic device according to various embodiments.

According to various embodiments, referring to FIG. 6, the electronic device (e.g., the electronic device 101 or processor 120 of FIG. 1) may divide an input image into three divided images 611, 612, and 613. According to various embodiments, the electronic device may obtain the image characteristics of each of the three divided images 611, 612, and 613 before or after dividing.

For example, upon identifying among the three divided images 611, 612, and 613, a first divided image 611 has an image complexity equal to or larger than a set value, a second divided image 612 has an image complexity less than the set value, and a third divided image 613 includes a specific object (e.g., face image, plant, car, or food), the electronic device may input the first divided image 611 to the first deep learning model among the plurality of deep learning models 210, input the second divided image 612 to the second deep learning model, and the third divided image 613 to the third deep learning model.

According to various embodiments, the electronic device may perform upscaling in parallel (t1) on the first divided image 611, the second divided image 612, and the third divided image 613 through the first deep learning model, the second deep learning model, and the third deep learning model, respectively.

According to various embodiments, the electronic device may obtain an upscaled image by merging (620) the upscaled divided images respectively corresponding to the three divided images 611, 612, and 613 output from the first deep learning model, the second deep learning model, and third deep learning model and output the obtained upscaled image.

Figure 7:
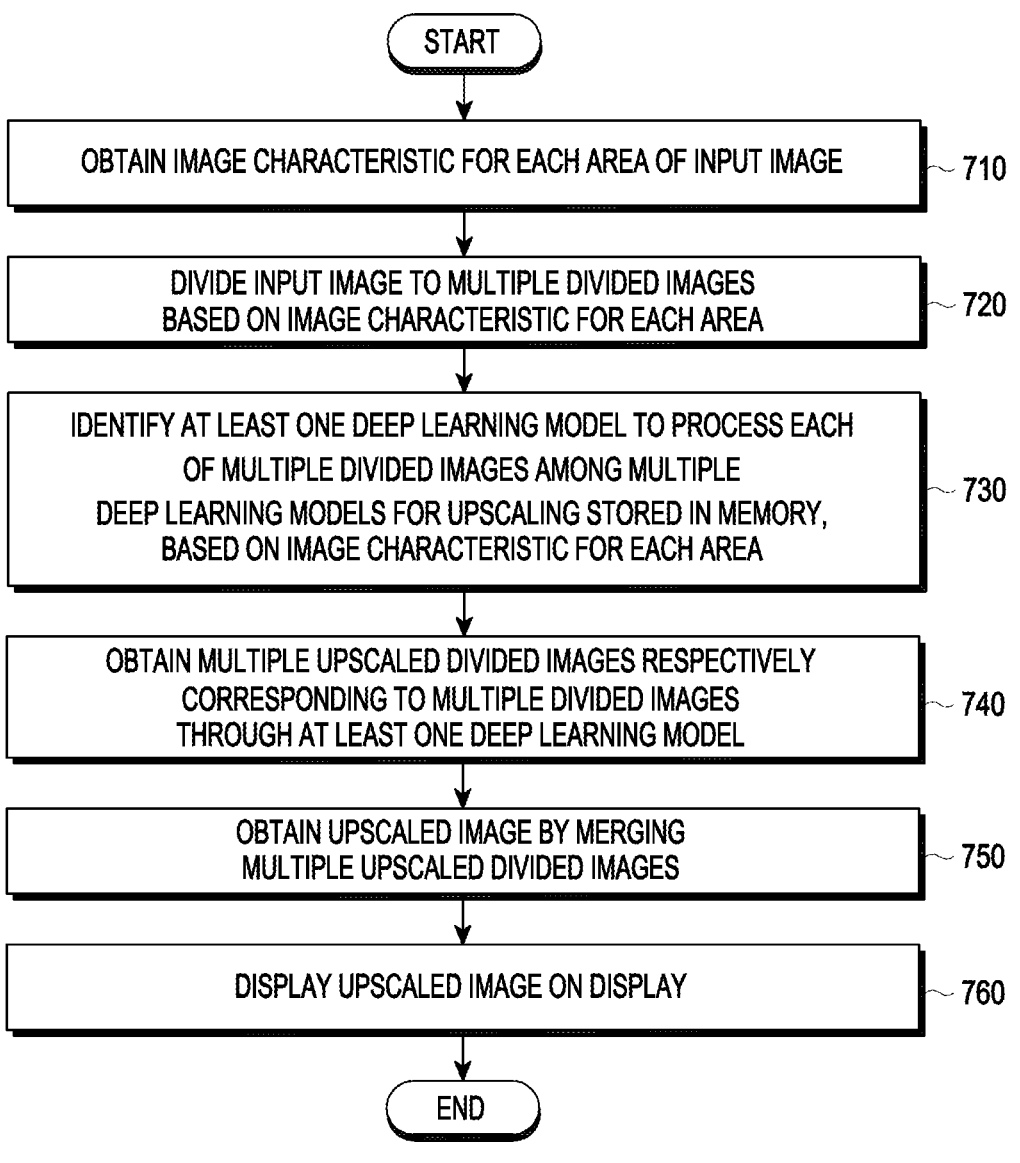
FIG. 7 is a flowchart illustrating an example image upscaling operation to divide an image according to image characteristics by an electronic device according to various embodiments.

FIG. 7 is a flowchart illustrating an example image upscaling operation to divide an image according to image characteristics by an electronic device according to various embodiments.

According to various embodiments, referring to FIG. 7, in operation 710, the electronic device (e.g., the electronic device 101 or processor 120 of FIG. 1) may obtain the image characteristics for each area of an input image (e.g., the input image 21 of FIG. 2).

For example, the electronic device may obtain at least one of the image complexity for each area of the input image or whether a specific object (e.g., face image, plant, car, or food) is included, as an image characteristic.

According to various embodiments, the electronic device may, for example, identify at least one of an area where the image complexity in the input image is a set value or more, an area where the image complexity is less than the set value, or an area where a specific object is included.

According to various embodiments, in operation 720, the electronic device may divide the input image into a plurality of divided images based on the image characteristics for each area.

For example, the electronic device may identify at least one of the size, shape, or number of the plurality of divided images based on the image complexity for each area in the input image or whether a specific object is included and divide the input image into a plurality of divided images based on at least one of the size, shape, or number of the plurality of divided images.

Figures 8A, 8B:
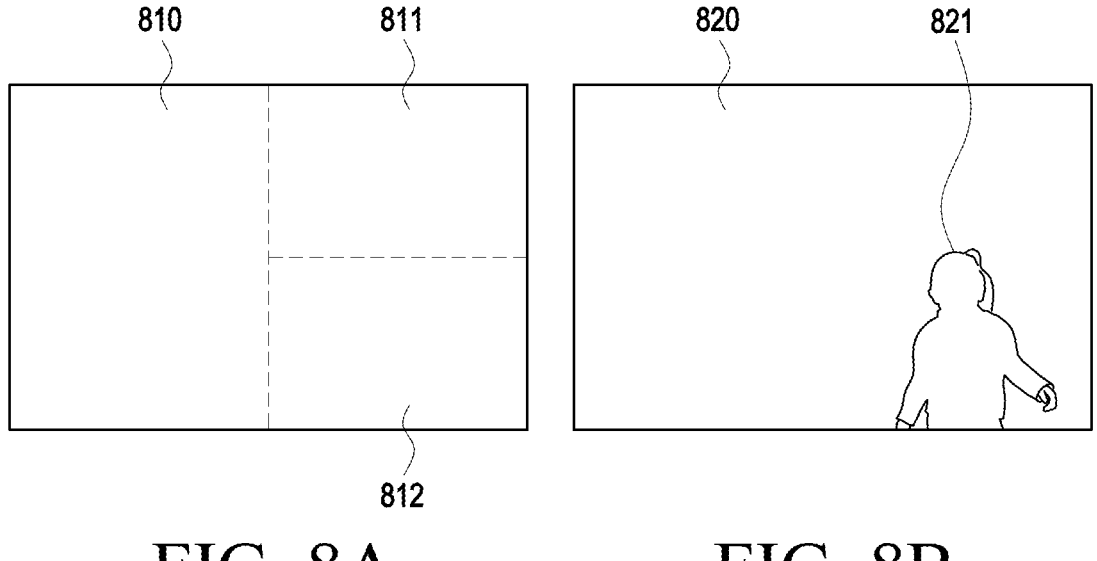
FIGS. 8A and 8B are views illustrating an example operation of dividing an image according to various embodiments.

FIGS. 8A and 8B are views illustrating an example operation of dividing an image according to various embodiments.

For example, referring to FIG. 8A, the electronic device (e.g., the electronic device 101 or processor 120 of FIG. 1) may divide an area 810 having a low image complexity in the input image into a large divided image and divide areas 811 and 812 having a high image complexity into small divided images. Thus, it is possible to reduce processing loads of the deep learning model upscaling the divided images with high image complexity.

According to various embodiments, referring to FIG. 8B, the electronic device may divide the background area 820 which does not include a specific object (e.g., face image, plant, car, or food) into a first divided image and the area 821 including a specific object (e.g., face image, plant, car, or food) into a second divided image. For example, the second divided image may be divided in the contour shape of the specific object, and the first divided image may be divided in a shape except for the shape of the first divided image.

According to various embodiments, the electronic device may perform padding so that each divided image overlaps its adjacent divided image in a set size of area, for a border processing operation in an operation for merging the plurality of upscaled divided images in subsequent operation 750. According to various embodiments, the size of the area where padding is to be performed may be adjusted according to the image complexity of the divided image. For example, the electronic device may identify that the area where padding is to be performed is wide if the complexity of the divided image is high and, if the complexity of the divided image is low, the area where padding is to be performed may be narrow. According to various embodiments, the dividing operation considering the padding operation is described below with reference to FIG. 9.

According to various embodiments, in operation 730, the electronic device may input each of the plurality of divided images to at least one deep learning model to process each of the plurality of divided images among the plurality of deep learning models (e.g., the plurality of deep learning models 210 of FIG. 2) for upscaling stored in the memory (e.g., the memory 190 of FIG. 1), based on the image characteristics for each area.

For example, since the input image is divided into the plurality of divided images based on the image characteristics for each area of the input image, the electronic device may input each of the plurality of divided images to at least one deep learning model to process each of the plurality of divided images among the plurality of deep learning models, based on the image characteristics of each of the plurality of divided images, without a separate image complexity identification operation.

According to various embodiments, in operation 740, the electronic device may obtain a plurality of upscaled divided images respectively corresponding to the plurality of divided images through at least one deep learning model.

According to various embodiments, in operation 750, the electronic device may obtain an upscaled image by merging the plurality of upscaled divided images.

According to various embodiments, in operation 760, the electronic device may display the upscaled image on the display (e.g., the display module 160 of FIG. 1).

According to various embodiments, operations 730 to 760 in FIG. 7 are the same as operations 330 to 360 in FIG. 3, and thus, the description thereof is not repeated.

Figure 9:
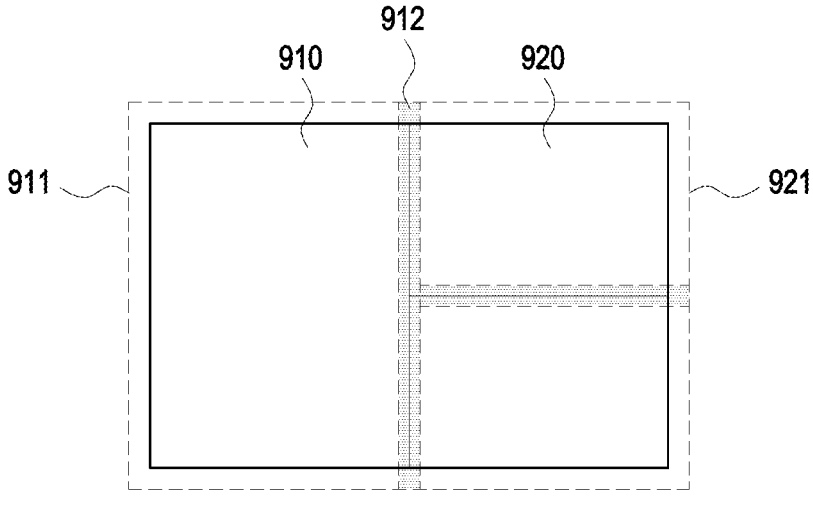
FIG. 9 is a view illustrating an example padding operation performed when dividing an image according to various embodiments.

FIG. 9 is a view illustrating an example padding operation performed when dividing an image according to various embodiments.

According to various embodiments, referring to FIG. 9, the electronic device (e.g., the electronic device 101 or processor 120 of FIG. 1) may divide the input image into areas including areas 910 and 920 based on at least one of the available size of the memory, the size of the input image, the computational capability of at least one processor, the size of each of the plurality of deep learning models, or image characteristics for each area of the input image.

According to various embodiments, the electronic device may perform padding so that each divided image overlaps its adjacent divided image in a set size of area, for a border processing operation in an operation for merging the plurality of upscaled divided images obtained through the deep learning model.

For example, the electronic device may obtain a first divided image 911 to be as large as a size (e.g., four pixels) set for each border of the first area 910, obtain a second divided image 921 to be as large as a size (e.g., four pixels) set for each border of the second area 920, and obtain a third divided image to be as large as a size (e.g., four pixels) set for each border of the third area.

According to various embodiments, the electronic device may obtain a divided image by including as many zero-pixel value areas as the set size in the outer border area of the input image.

According to various embodiments, as the divided images are obtained to be as large as the size set for each area 910 and 920 of the input image, the border between the first divided image 911 and the second divided image 921 includes an overlapping area 912.

According to various embodiments, the size of the area where padding is to be performed may be adjusted according to the image complexity of the divided image. For example, the electronic device may identify that the area where padding is to be performed is wide if the complexity of the divided image is high and, if the complexity of the divided image is low, the area where padding is to be performed is narrow.

According to various embodiments, the electronic device may perform a border processing operation in the padding area corresponding to the overlapping area 912 of the plurality of upscaled divided images output through at least one deep learning model. For example, the electronic device may perform a border processing operation by determining that the average of the pixel value of the padding area corresponding to the overlapping area 912 of the divided image before upscaling in the upscaled divided image and the pixel value of the padding area corresponding to the overlapping area 912 of the adjacent divided image before upscaling in the adjacent upscaled divided image is the pixel value of the padding area corresponding to the overlapping area 912 of the divided image before upscaling in the upscaled divided image. According to various embodiments, when the upscaled divided image and the adjacent upscaled divided image are output from different deep learning models, the electronic device may determine that the average obtained after applying a different weight to the pixel value of each padding area is the pixel value of the padding area of each of the upscaled divided image and the adjacent upscaled divided image.

According to an embodiment, the electronic device may perform a border processing operation by determining that the average pixel value of the padding area corresponding to the overlapping area 912 of the additional device information before upscaling in the adjacent upscaled divided image is the pixel value of the padding area corresponding to the overlapping area 912 of the divided image before upscaling in the upscaled divided image. For example, the electronic device may determine that the pixel value of the padding area of the upscaled divided image is the pixel value of the padding area of the adjacent upscaled divided image and that the pixel value of the padding area of the adjacent upscaled divided image is the pixel value of the padding area of the upscaled divided image.

Figure 10:
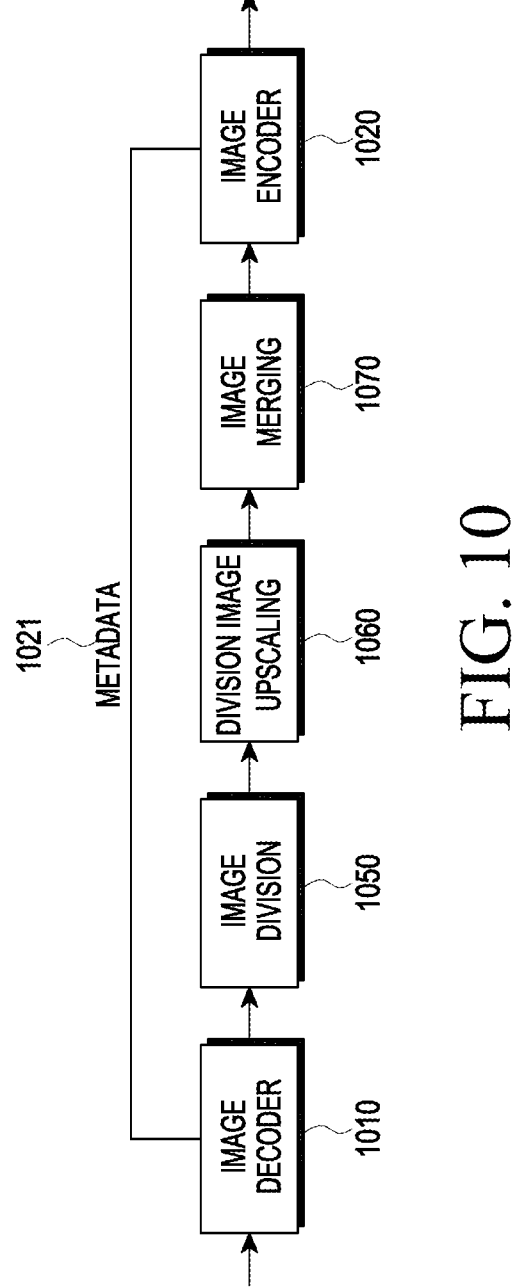
FIG. 10 is a view illustrating an example operation of storing metadata in an upscaled image according to various embodiments.

FIG. 10 is a view illustrating an example operation of storing metadata in an upscaled image according to various embodiments.

According to various embodiments, referring to FIG. 10, the electronic device (e.g., the electronic device 101 or processor 120 of FIG. 1) may input an input image (e.g., the input image 21 of FIG. 2) to an image decoder 1010 to identify the image characteristics for each area of the input image.

According to various embodiments, the electronic device may divide the image based on the image characteristics for each area (1050), perform divided image upscaling through a deep learning model (1060), and image-merge the upscaled divided images to obtain an upscaled image (1070). The image dividing operation, upscaling operation, and merging operation are the same as those described in connection with FIGS. 3 and 7, and the description thereof is not repeated.

According to various embodiments, the electronic device may input the upscaled image to an image encoder 1020. According to various embodiments, the electronic device may input at least one of the image dividing information or deep learning model information obtained from the image decoder 1010, as metadata, to the image encoder 1020 and add it to the upscaled image.

According to various embodiments, the electronic device may store the image complexity for each area of the input image, whether a specific object is included, information about the used deep learning model, and position information (e.g., border pixel information) about each divided image, as metadata of the upscaled image.

According to various embodiments, upon performing additional upscaling of the upscaled image, the electronic device may perform an additional upscaling operation based on the metadata without analysis of the upscaled image.

According to various example embodiments, an electronic device (e.g., the electronic device 101 of FIG. 1) may include a memory (e.g., the memory 130 of FIG. 1), a display (e.g., the display module 160 of FIG. 1), and at least one processor (e.g., the processor 120 of FIG. 1) operatively connected with the memory and the display. The at least one processor may be configured to divide an input image (e.g., the input image 21 of FIG. 2) into a plurality of divided images, obtain an image characteristic included in each of the plurality of divided images, identify at least one deep learning model to process each of the plurality of divided images from among a plurality of deep learning models (e.g., the plurality of deep learning models 210 of FIG. 2) for upscaling stored in the memory, based on the image characteristic, obtain a plurality of upscaled divided images respectively corresponding to the plurality of divided images through the at least one deep learning model, obtain an upscaled image (e.g., the upscaled image 22 of FIG. 2) by merging the plurality of upscaled divided images, and display the upscaled image on the display.

According to various example embodiments, the at least one processor (e.g., the processor 120 of FIG. 1) may identify at least one of a number of the plurality of divided images or a size of the plurality of divided images based on at least one of an available size of the memory (e.g., the memory 130 of FIG. 1) or a size of the input image.

According to various example embodiments, the at least one processor (e.g., the processor 120 of FIG. 1) may obtain at least one of an image complexity of each of the plurality of divided images or whether a face image is included, as the image characteristic.

According to various example embodiments, the at least one processor (e.g., the processor 120 of FIG. 1) may identify a deep learning model, to process a divided image not including a face image and having an image complexity equal to or larger than a set value among the plurality of divided images, as a first deep learning model, identify a deep learning model, to process a divided image not including a face image and having an image complexity less than the set value among the plurality of divided images, a second deep learning model, and identify a deep learning model, to process a divided image including a face image among the plurality of divided images, as a third deep learning model.

According to various example embodiments, when the at least one processor (e.g., the processor 120 of FIG. 1) includes a plurality of processors, each of the plurality of processors may perform image upscaling through at least one of the plurality of deep learning models.

According to various example embodiments, each of the plurality of divided images may be padded to overlap a neighboring divided image in a set size of area.

According to various example embodiments, the at least one processor (e.g., the processor 120 of FIG. 1) may obtain an average of a pixel value of a padding area corresponding to the area of each of the plurality of upscaled divided images and a pixel value of a padding area corresponding to the area of a neighboring upscaled divided image of each of the plurality of upscaled divided images, as a pixel value of the area.

According to various example embodiments, the at least one processor (e.g., the processor 120 of FIG. 1) may resize the area based on an image complexity of each of the plurality of divided images.

According to various example embodiments, the at least one processor (e.g., the processor 120 of FIG. 1) may store at least one of information about the image characteristic, information about the identified at least one deep learning model, or position information about the plurality of divided images, as metadata of the upscaled image.

According to various example embodiments, a method for controlling an electronic device (e.g., the electronic device 101 of FIG. 1) may comprise dividing an input image into a plurality of divided images, obtaining an image characteristic included in each of the plurality of divided images, identifying at least one deep learning model to process each of the plurality of divided images from among a plurality of deep learning models for upscaling stored in a memory, based on the image characteristic, obtaining a plurality of upscaled divided images respectively corresponding to the plurality of divided images through the at least one deep learning model, obtaining an upscaled image by merging the plurality of upscaled divided images, and displaying the upscaled image.

According to various example embodiments, the dividing may include identifying at least one of a number of the plurality of divided images or a size of the plurality of divided images based on at least one of an available size of the memory or a size of the input image.

According to various example embodiments, obtaining the image characteristic may obtain at least one of an image complexity of each of the plurality of divided images or whether a face image is included, as the image characteristic.

According to various example embodiments, the identifying may identify a deep learning model, to process a divided image not including a face image and having an image complexity equal to or larger than a set value among the plurality of divided images, as a first deep learning model, identify a deep learning model, to process a divided image not including a face image and having an image complexity less than the set value among the plurality of divided images, a second deep learning model, and identify a deep learning model, to process a divided image including a face image among the plurality of divided images, as a third deep learning model.

According to various example embodiments, obtaining the plurality of upscaled divided images may be performed by each of a plurality of processors using at least one of the plurality of deep learning models when the electronic device includes the plurality of processors.

According to various example embodiments, the dividing may pad each of the plurality of divided images to overlap a neighboring divided image in a set size of area.

According to various example embodiments, obtaining the upscaled image may obtain an average of a pixel value of a padding area corresponding to the area of each of the plurality of upscaled divided images and a pixel value of a padding area corresponding to the area of a neighboring upscaled divided image of each of the plurality of upscaled divided images, as a pixel value of the area.

According to various example embodiments, the method may further comprise resizing the area based on the image complexity of each of the plurality of divided images.

According to various example embodiments, the method may further include storing at least one of information about the image characteristic, information about the identified at least one deep learning model, or position information about the plurality of divided images, as metadata of the upscaled image.

According to various example embodiments, an electronic device (e.g., the electronic device 101 of FIG. 1) may include a memory (e.g., the memory 130 of FIG. 1), a display (e.g., the display 160 of FIG. 1), and at least one processor (e.g., the processor 120 of FIG. 1) operatively connected with the memory and the display. The at least one processor may be configured to obtain an image characteristic for each area of an input image (e.g., the input image 21 of FIG. 2), divide the input image into a plurality of divided images based on the image characteristic for each area, identify at least one deep learning model to process of each of the plurality of divided images from among a plurality of deep learning models for upscaling stored in the memory based on the image characteristic for each area, obtain a plurality of upscaled divided images respectively corresponding to the plurality of divided images through the at least one deep learning model, obtain an upscaled image by merging the plurality of upscaled divided images, and display the upscaled image on the display.

According to various example embodiments, the at least one processor (e.g., the processor 120 of FIG. 1) may obtain at least one of an image complexity of the input image or whether a face image is included as the image characteristic, identify at least one of a size, shape, or number of each of the plurality of divided images based on the image complexity or whether the face image is included, and divide the input image into the plurality of divided images based on at least one of the size, shape, or number of each of the plurality of divided images.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers to the storage medium being a tangible device, and does not include a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
memory storing instructions;
a display; and
at least one processor, comprising processing circuitry, operatively connected with the memory and the display, wherein the instructions, when executed by the at least one processor, individually or collectively, cause the electronic device to:
divide an input image into a plurality of divided images, wherein a first divided image the plurality of divided images includes a padding area which overlaps with an adjacent divided image, and a seize of the padding area is based on a complexity of the first divided image;
obtain an image characteristic included in each of the plurality of divided images;
identify, based on the image characteristic, at least one deep learning model to process each of the plurality of divided images from among a plurality of deep learning models for upscaling stored in the memory;
obtain, through the at least one deep learning model, a plurality of upscaled divided images respectively corresponding to the plurality of divided images;
obtain an upscaled image by merging the plurality of upscaled divided images based on a border processing operation for upscaled images of the first divided image and the adjacent divided images using the padding area; and
display the upscaled image on the display.

2. The electronic device of claim 1, wherein the instructions, when executed by the at least one processor, individually or collectively, cause the electronic device to identify at least one of a number of the plurality of divided images or a size of the plurality of divided images based on at least one of an available size of the memory or a size of the input image.

3. The electronic device of claim 1, wherein the instructions, when executed by the at least one processor, individually or collectively, cause the electronic device to obtain, as the image characteristic, at least one of image complexity of each of the plurality of divided images or whether a face image is included.

4. The electronic device of claim 3, wherein the instructions, when executed by the at least one processor, individually or collectively, cause the electronic device to:
identify, as a first deep learning model, a deep learning model to process a divided image not including a face image and having an image complexity equal to or larger than a set value among the plurality of dividing images;
identify, as a second deep learning model, a deep learning model to process a divided image not including a face image and having an image complexity less than the set value among the plurality of dividing images; and
identify, as a third deep learning model, a deep learning model to process a divided image including a face image among the plurality of dividing images.

5. The electronic device of claim 1, comprising a plurality of processors, each of the plurality of processors comprising processing circuitry and being configured to perform image upscaling through at least one of the plurality of deep learning models.

6. The electronic device of claim 1, wherein the instructions, when executed by the at least one processor, individually or collectively, cause the electronic device to obtain an average of a pixel value of a padding area corresponding to the area of each of the plurality of upscaled divided images and a pixel value of a padding area corresponding to the area of a neighboring upscaled divided image of each of the plurality of upscaled divided images, as a pixel value of the area.

7. The electronic device of claim 1, wherein the instructions, when executed by the at least one processor, individually or collectively, cause the electronic device to store, as metadata of the upscaled image, at least one of information about the image characteristic, information about the identified at least one deep learning model, or position information about the plurality of divided images.

8. The electronic device of claim 1, wherein the size of the padding area increases as a complexity of the first divided image increases.

9. A method for controlling an electronic device, the method comprising:
dividing an input image into a plurality of divided images, wherein a first divided image of the plurality of divided images includes a padding area which overlaps with an adjacent divided image, and a size of the padding area is based on a complexity of the first divided image;
obtaining an image characteristic included in each of the plurality of divided images;
identifying, based on the image characteristic, at least one deep learning model to process each of the plurality of divided images from among a plurality of deep learning models for upscaling stored in a memory;
obtaining, through the at least one deep learning model, a plurality of upscaled divided images respectively corresponding to the plurality of divided images;
obtaining an upscaled image by merging the plurality of upscaled divided images based on a border processing operation for upscaled images of the first divided image and the adjacent divided images using the padding area; and
displaying the upscaled image.

10. The method of claim 9, wherein the dividing includes identifying at least one of a number of the plurality of divided images or a size of the plurality of divided images based on at least one of an available size of the memory or a size of the input image.

11. The method of claim 9, wherein obtaining the image characteristic obtains, as the image characteristic, at least one of image complexity of each of the plurality of divided images or whether a face image is included.

12. The method of claim 11, wherein the identifying identifies, as a first deep learning model, a deep learning model to process a divided image not including a face image and having an image complexity equal to or larger than a set value among the plurality of divided images; identifies, as a second deep learning model, a deep learning model to process a dividing image not including a face image and having an image complexity less than the set value among the plurality of dividing images; and identifies, as a third deep learning model, a deep learning model to process a divided image including a face image among the plurality of divided images.

13. The method of claim 9, wherein obtaining the plurality of upscaled divided images is performed by each of a plurality of processors using at least one of the plurality of deep learning models when the electronic device includes the plurality of processors.

14. The method of claim 9, wherein obtaining the plurality of upscaled divided images comprising obtaining, as a pixel value of the area, an average of a pixel value of a padding area corresponding to the area of each of the plurality of upscaled divided images and a pixel value of a padding area corresponding to the area of a neighboring upscaled divided image of each of the plurality of upscaled divided images.

15. The method of claim 9, further comprising storing, as metadata of the upscaled image, at least one of information about the image characteristic, information about the identified at least one deep learning model, or position information about the plurality of divided images.

16. The method of claim 9, wherein the size of the padding area increases as a complexity of the first divided image increases.

17. An electronic device comprising:

memory storing instructions;

a display; and at least one processor, comprising processing circuitry, operatively connected with the memory and the display, wherein the instructions, when executed by the at least one processor, individually or collectively, cause the electronic device to:

obtain an image characteristic for each area of an input image, divide the input image into a plurality of divided images based on the image characteristic for each area, wherein a first divided image of the plurality of divided images includes a padding area which overlaps with an adjacent divided image, and a size of the padding area is based on a complexity of the first divided image, identify at least one deep learning model to process of each of the plurality of divided images from among a plurality of deep learning models for upscaling stored in the memory based on the image characteristic for each area, obtain a plurality of upscaled divided images respectively corresponding to the plurality of divided images through the at least one deep learning model, obtain an upscaled image by merging the plurality of upscaled divided images based on a border processing operation for upscaled images of the first divided image and the adjacent divided images using the padding area, and display the upscaled image on the display.

18. The electronic device of claim 17, wherein the instructions, when executed by the at least one processor, individually or collectively, cause the electronic device to:

obtain at least one of an image complexity of the input image or whether a face image is included as the image characteristic, identify at least one of a size, shape, or number of each of the plurality of divided images based on the image complexity or whether the face image is included, and divide the input image into the plurality of divided images based on at least one of the size, shape, or number of each of the plurality of divided images.

* * * * *